No. 670,330. Patented Mar. 19, 1901.
F. SCHUMANN.
STEAM INLET VALVE.
(Application filed Dec. 13, 1900.)
(No Model.) 2 Sheets—Sheet 1.

Witnesses:-

Inventor:
Francis Schumann.
by his Attorneys:-

No. 670,330. Patented Mar. 19, 1901.
F. SCHUMANN.
STEAM INLET VALVE.
(Application filed Dec. 13, 1900.)
(No Model.) 2 Sheets—Sheet 2.
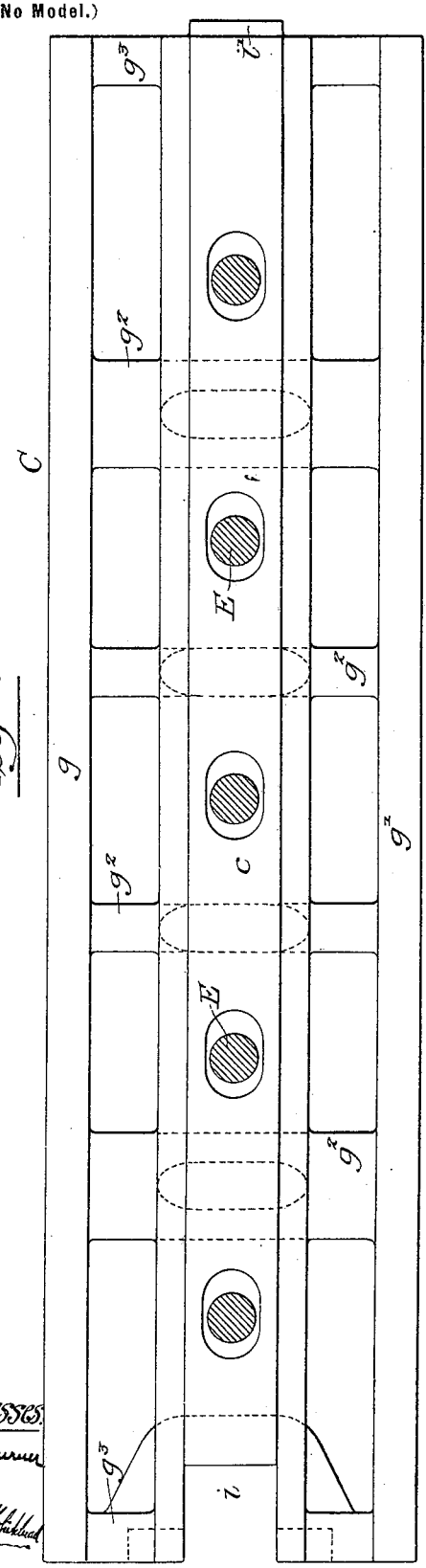
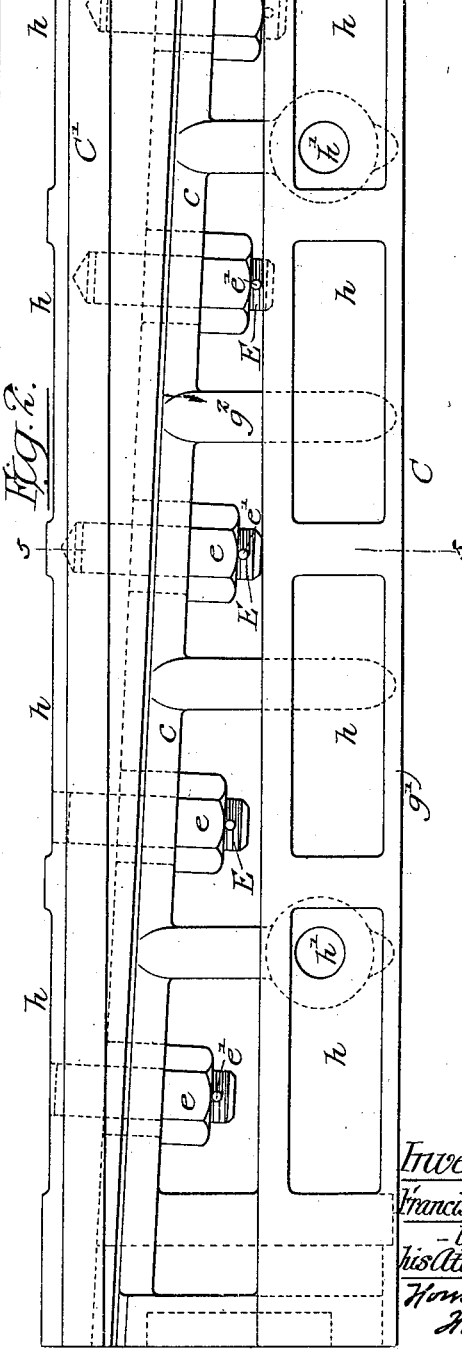
Witnesses
Inventor:
Francis Schumann
-by-
his Attorneys

UNITED STATES PATENT OFFICE.

FRANCIS SCHUMANN, OF PHILADELPHIA, PENNSYLVANIA.

STEAM-INLET VALVE.

SPECIFICATION forming part of Letters Patent No. 670,330, dated March 19, 1901.

Application filed December 13, 1900. Serial No. 39,741. (No model.)

*To all whom it may concern:*

Be it known that I, FRANCIS SCHUMANN, a citizen of the United States, residing in Philadelphia, Pennsylvania, have invented certain Improvements in Steam-Inlet Valves, of which the following is a specification.

My invention relates to certain improvements in high-pressure steam and exhaust valves to be used in connection with engines of the Corliss type, having for one object the provision of a valve which will by its construction allow the clearance to be reduced to a minimum.

Further objects of my invention are to construct a valve of the above type which shall be at all times balanced and which may be adjusted to compensate for any wear either of the valve or of the valve-chamber.

These objects I attain as hereinafter set forth, reference being had to the accompanying drawings, in which—

Figure 5:
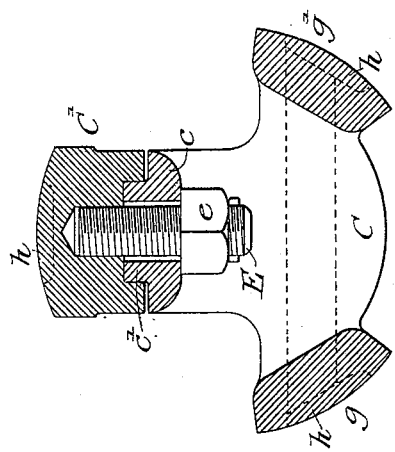
Figure 6:
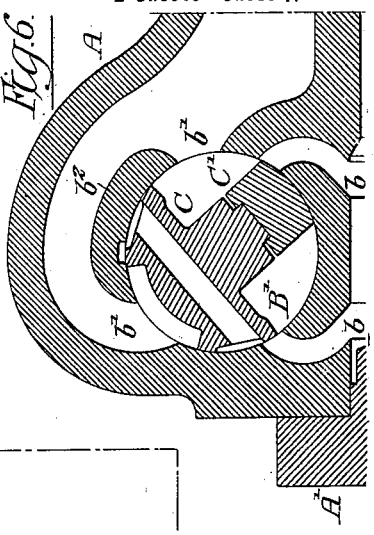
Figure 1:
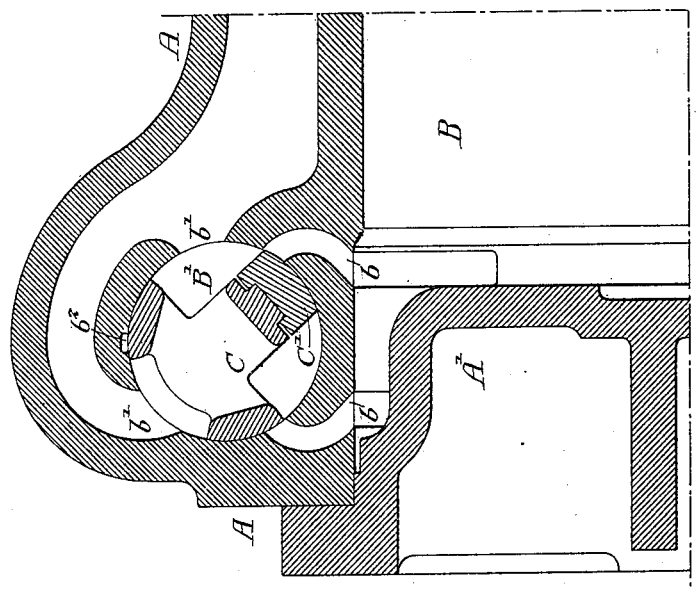
Figure 4:
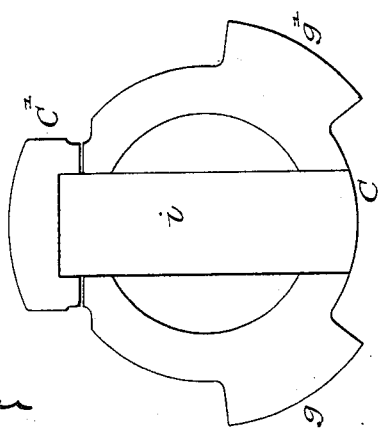

Figure 1 is a longitudinal sectional view through one end of an engine-cylinder, showing the position of one of my improved valves in relation to one of the ports and to the interior of the cylinder. Fig. 2 is a side elevation of my improved valve. Fig. 3 is a plan view of the same with one section of the valve removed. Fig. 4 is an end view of the valve, showing the recess for the reception of the T end of the valve-rod. Fig. 5 is a cross-sectional view on the line 5 5, Fig. 2; and Fig. 6 is a sectional view similar to Fig. 1, but taken through one of the equalizing-passages in the body of the valve.

In Fig. 1, A is a portion of one end of an engine-cylinder, and A' a portion of the head thereof. B is the interior of the cylinder, into which open two ports $b\ b$, leading from a valve-chamber B'. A passage $b'$, divided in the present instance into two where it enters the valve-chamber, connects the same to a steam-supply passage or to the exhaust-passage, as the case may be.

At a point in the valve-chamber preferably one hundred and twenty degrees distant from each of the two ports $b\ b$ a recess or port $b^2$ opens, being made rectangular in the present instance and extending the length of the valve-chamber. A valve is constructed to fit the chamber and is of a section preferably Y-shaped, there being a valve-face at the extremity of each limb. It is made in two sections, C and C', the latter being wedge-shaped and the former having a bolting-section $c$, the face of which runs at an angle to the axis of the valve and on which the section C' is constructed to slide. Bolts E serve to hold the two sections together, being tapped into the section C' and projecting through holes in the bolting-section $c$, which are elongated in a direction parallel to the axis of the valve. Each of these bolts has a nut $e$ on it and a hole $e'$ through its end for a cotter-pin. A tongue or projection $c'$ on one of the valve-sections, in the present case on C, is made to fit a corresponding groove or recess in the other valve-section, making it possible when the nuts on the bolts E are slacked to move one section longitudinally upon the other, while preventing any side motion thereof. This allows any wear of the valve or chamber to be taken up, for by moving one of the parts in one direction their combined diameter will be increased.

Ribs $g^2$ and end pieces $g^3$ serve to hold together the face-sections $g\ g'$ and the bolting-section $c$ of the part C. The parts $g\ g'$ and C' of the valve have recesses $h$ in their faces, of the shape plainly shown in dotted lines in Fig. 4, and passages $h'$, running through the ribs $g^2$, connect certain of the recesses $g$ with the corresponding recesses $g'$.

One end of the section C of the valve is recessed at $i$ to receive the T-shaped end of the valve-rod of a type common in Corliss engines. The recess is preferably of the same width as the tongue or projection $c'$, which is cut away in forming said recess, thus allowing the cross projection or T end of the valve-rod to enter the groove and to engage the section C' of the valve, as shown in Fig. 3. A projection $i'$ on the opposite end of the section C from the recess $i$ allows free access of steam to the end of the valve, and this, together with the peculiar shape of the valve, is one of the features tending to keep it balanced.

It will be seen that the part C' and the section $g'$ of the part C govern the admission of steam to the cylinder and that the section $g$ is added to complete the valve mechanically.

In order that there may always be equal pressure under all three of the faces $g$, $g'$, and C, the passages $h'$ connect the recesses in the face $g'$ with those in the face $g$, and hence when the valve is in its closed position, as in Fig. 6, they connect the interior of the cylinder with the false port $b^2$. Thus it will be noted that the valve is at all times balanced—in other words, that the work of reciprocating it is not increased by the pressure of the steam. This is an important gain over what has heretofore been possible in Corliss engines, as ordinarily a very considerable part of the work of the engine has been expended in operating the valve-gear. By the use of my improved valves not only by far the larger part of this work is saved, but it is possible to construct the valve-gear of much lighter material than has heretofore been permissible.

By means of the movable wedge-shaped section $C'$ it is possible to adjust the valve to prevent leakage of steam in case of wear either of the valve or of the valve-chamber, for by slacking the nuts $e$ and moving the sections together the diameter of the valve may be increased to the desired amount, thus making it possible to compensate for such wear.

I claim as my invention—

1. The combination in a valve for a steam-engine, of a casting having in it a valve-chamber, a passage connecting the chamber with a source of steam-supply, ports in the chamber communicating with the engine-cylinder and a three-faced valve in the chamber two of the faces thereof controlling the passage of steam through the ports, substantially as described.

2. The combination in an engine-valve, of a cylinder-casting, a valve-chamber therein, connection between the chamber and the source of steam-supply, two ports connected to one end of the cylinder, and a closed passage in the casting forming a false port, all opening into the chamber, and a three-faced valve in the chamber constructed to control the passage of steam from the source of supply through the ports, substantially as described.

3. The combination with a valve-chamber of the character described, of a three-faced valve, said valve being in two parts adjustably connected together, one of said parts consisting of two face-sections and a bolting-section connected by ribs, the other part being wedge-shaped and constructed to move on the first part, substantially as described.

4. In a valve of the character described, the combination of a wedge-shaped part or piece with a second part consisting of two face-sections connected to a bolting-section by ribs, the said bolting-section having elongated holes through it, bolts for holding the two parts of the valve rigidly together, said bolts passing through the said holes and entering the wedge-shaped part of the valve, a tongue on one of said valve parts, and a corresponding groove on the other, whereby when the bolts are slackened, the two sections may be moved longitudinally upon one another, substantially as described.

5. A three-faced valve of the character described, constructed to fit a cylindrical valve-chamber, one of the faces thereof being movable relatively to the others, whereby the circular diameter of the valve may be varied, substantially as described.

6. The combination of an engine-cylinder casting, a cylindrical valve-chamber therein, a passage from a source of steam-supply and passages or ports from the engine-cylinder, all opening into said chamber, a false passage or port, and a three-faced valve, having two of its faces adapted to cover the two ports of the cylinder, and its third face adapted to cover the false port, passages through the valve giving communication between the false port and one of the ports of the engine-cylinder when the valve-faces are over the ports, substantially as described.

7. The combination in a cylinder-casting, of a valve-chamber, two ports connecting the chamber with the cylinder, a false port in said chamber, a three-faced valve, recesses in each face of the valve running parallel with the ports, and passages in the valve connecting the recesses in the valve-face adjacent to the false port with those in the faces adjacent to one of the ports leading to the cylinder, substantially as described.

8. In a valve of the character described, the combination of two sections movable longitudinally upon one another, a recess across the end of the valve extending into both sections and adapted to receive the T-shaped end of a valve-rod, substantially as described.

9. The combination in a cylinder-casting, of a valve-chamber, ports therein, a multiple-faced valve in said chamber, one of the faces thereof being movable relatively to the others, thereby providing means for varying the diameter of the valve, substantially as described.

In testimony whereof I have signed my name to this specification in the presence of two subscribing witnesses.

FRANCIS SCHUMANN.

Witnesses:
WILLIAM E. BRADLEY,
JOS. H. KLEIN.